United States Patent Office 2,982,707
Patented May 2, 1961

2,982,707
ELECTROPHORETIC DISPERSION

Howard G. Scheible, Livingston, N.J., assignor to Vitro Corporation of America, Verona, N.J.

No Drawing. Filed July 30, 1958, Ser. No. 751,853

9 Claims. (Cl. 204—181)

This invention relates to a novel coating suspension to be used in the electrophoretic deposition of metallic and composite coatings on base materials and to the method of depositing such suspensions on base materials.

The electrophoretic coating process involves the steps of preparing a suspension which contains the particles of coating material, depositing the particles on the base material by electrophoresis, and thereafter treating the coating as by densification and heating.

The coating suspension is prepared by dispersing the coating material in a suitable liquid vehicle, preferably an organic solvent such as alcohol. The suspension may be prepared by ball milling the coating particles in the solvent to obtain a finely dispersed material. Particles ranging in diameter from 0.5 to 10 microns are preferred, although dispersions containing particles from 0.1 micron to 74 microns have been prepared and deposited. The electrical charge on the particles is acquired during the dispersing operation because of adsorption of ionizable substances or a reaction between the solid and the liquid. The organic liquids are preferred for use as suspending vehicles to prevent electrolytic reaction and gassing at the electrodes.

Coating suspensions prepared by such methods have caused difficulties because the rate of deposition of the coating particles on the base material is very slow. A further difficulty is the tendency of the dispersed coating particles to flocculate out of the suspension, thus rendering the coating suspensions very unstable. It has also been noted that particles in suspensions prepared by ball milling lose their electrical charge very rapidly.

Various activators have been added to the coating suspensions in order to overcome the difficulties mentioned above. Tannic acid, chromic hydroxide, nickel chloride, nitrocellulose and ethyl cellulose are examples of some of these activators. The activators now in use, however, have not proven entirely satisfactory. They must be added in carefully and closely regulated amounts or else they will flocculate particles in suspension. In order to impart good wet and green strength to the deposited coatings, these activators must be added in amounts which greatly reduce the deposition rate of the coating particles on the base material.

It has been found that suspensions prepared by the ordinary ball milling technique employing the above listed activators, show a tendency to lose their charge quite rapidly, and hence they fail to extend the useful plating life of the suspensions.

It has now been found that improved suspensions for electrophoretic deposition of metallic solids, such as metals or metal oxides, and also ceramics on a wide variety of base materials can be formed by using a prolamine as the electrophoretic activator in coating suspensions.

Prolamines are proteins found in cereal grains which are soluble in 70% to 80% alcohol, insoluble in water, dilute neutral salt solutions and absolute ethyl alcohol, and rich in proline and glutamic acid. Examples of prolamines are gliadin from wheat, hordein from barley, secalin from rye, kafirin from kefir, and zein from maize.

The use of prolamines provides activation of the coating suspension which consistently yields suspensions of predictable rapid deposition rate. The prolamines also impart good wet and green strength to the deposited coatings without decreasing the deposition rate of the suspension. As pointed out above, previous activators gave sufficient strength to the coating but the deposition rate of the coating suspension was greatly reduced. The use of prolamine activators also stabilizes the suspension and decreases the flocculation effects. This is probably due to the fact that the protein imparts a high zeta potential to the coating particles in the suspension and thereby intensifies their mutual repulsion.

While dispersions prepared by the ordinary ball milling techniques and using prior art activators show a tendency to lose a charge quite rapidly, prolamine activated suspensions have been used for periods up to 19 days without appreciable decrease in deposition rate. Further, the use of prolamine enables a standard method for preparing electrophoretic coating suspensions of a great variety of materials. This is probably because the particles in contact with a prolamine solution acquire a monomolecular surface film of the protein that changes the character of the particles and improves the properties of the dispersion for electrophoretic purposes.

The amount of prolamine that can be added to the dispersion varies widely. It is possible to use amounts ranging from 0.5% up to about 5% by weight of prolamine based on the weight of the coating particles. Amounts of prolamine above 5% result in a slower deposition rate of the coating particles, although a better coating may be provided. It has also been found that the electrophoretic activity of a suspension varies inversely and the strength of the coating varies directly with the prolamine concentration. In order to obtain optimum activity and strength it is desirable to use prolamine concentrations varying from 1% to 3% based on the weight of the coating material.

The coating suspensions are prepared by mixing the coating particles with a prolamine in a liquid organic vehicle consisting of organic solvents, although any suitable liquid vehicle may be used. Any solvent can be used which has a high dielectric constant and a low viscosity. Some examples are acetone, methanol, propanol, isopropanol, 1-nitropropane, 2-nitropropane, nitromethane, nitroethane and mixtures thereof. It is preferred to use a solvent system consisting essentially of alcohols and nitroalkanes such as isopropyl alcohol.

In order to facilitate the preparation of the coating suspensions, it is desirable to prepare stock solutions of the prolamine and the organic solvent. These are prepared by adding the prolamine to the organic solvent system and shaking the mixture until a clear solution is obtained. An example of a typical method of preparing a prolamine stock solution is set forth below.

The stock solution is prepared from 900 g. of zein (corn, technical grade) and 1 liter of 60/40 (weight percent) isopropyl alcohol-nitromethane solvent, by shaking the mixture until a clear solution is obtained. The concentration of the stock solution is then determined by evaporation of the solvent from a 10 ml. portion of the solution. Sufficient isopropyl alcohol-nitromethane is then added to the stock solution to yield a final concentration of 9.0 g./liter. The diluted solution is filtered and its concentration is again determined. The stock solutions of prolamine can be varied to contain not only nine grams per liter of prolamine but also solutions containing 33 grams per liter, 10 grams per liter and 20 grams per liter of prolamine.

The following examples illustrate typical electrophoretic coating suspension formulations employing prolamines as an activator as well as the method of depositing said coatings.

EXAMPLE I

Forty-five grams of nickelous oxide (−325 mesh) are added to 150 ml. of a zein solution (9.0 g./liter) in a solvent system consisting of 60% isopropyl alcohol and 40% nitromethane by weight. The resultant slurry is stirred and then diluted with 105 ml. of the isopropyl alcohol-nitromethane solvent. The final dispersion contains approximately 15% nickel oxide (based on total weight of dispersion) and 3% zein (based on weight of nickel oxide). The zein solution is prepared by dilution from the stock solution described below.

A nickel oxide coating was electrophoretically deposited on an Inconel panel from the above dispersion by applying a negative potential of 300 volts to the panel for 45 seconds. Agitation was maintained during the deposition to prevent settling. The nickel oxide coating thus obtained measured 14 mils thick over a surface area of approximately 8.5 sq. cm. The current consumed was approximately 40 milliamperes.

After air drying the coated panel for approximately 10 minutes to remove the solvents, it was fired in a hydrogen atmosphere for 1 hour at 400° C. to reduce the oxide to metallic nickel. To facilitate handling the reduced coating at this point, a thin film of an acrylic resin, commercially known as Krylon, was sprayed over the entire panel. Prior to densifying the coating the coated panel was placed in a rubber envelope which was then evacuated to remove the air and subsequently compressed isostatically in a glycerine medium at approximately 50 t.s.i. to densify the coating. The densified coating was then sintered in a hydrogen atmosphere for 1 hour at 1200° C. which resulted in a well sintered, adherent, crack-free nickel coating on Inconel.

EXAMPLE II

Molybdenum dispersion

Thirty grams of molybdenum metal (−325 mesh) are added to 67 ml. of a zein solution (9.0 g./liter) in a solvent system consisting of 60% isopropyl alcohol and 40% nitromethane, by weight. The resultant slurry is stirred and then diluted with 233 ml. of a solvent containing 90% nitromethane-10% isopropyl alcohol by volume. The final dispersion contains approximately 10% molybdenum metal (based on total weight of dispersion) and 2% zein (based on weight of molybdenum).

A stainless steel cylinder having a surface area of 27 sq. cm. was coated with a molybdenum coating 7 mil thick from the above dispersion by applying a negative potential of 400 volts to the stainless steel cylinder for 3 minutes. The current consumed was approximately 15 milliamperes.

In the manner described in Example I, the coating was dried, bagged and densified at approximately 20 t.s.i. The densified coating was subsequently sintered in a hydrogen-HCl atmosphere for 20 minutes at 1200° C. and then in pure hydrogen for 2 hours at 1200° C. The coating, thus obtained, was well sintered, well bonded and crack-free.

EXAMPLE III

Copper oxide dispersion

Thirty grams of cuprous oxide (−325 mesh) are added to 27 ml. of a zein solution (33 g./liter) in a solvent system consisting of 60% isopropyl alcohol and 40% nitromethane by weight. The resultant slurry is stirred and then diluted with 186 ml. of isopropyl alcohol and 86 ml. of nitromethane. The final dispersion contains approximately 10% solids (based on total weight of dispersion) and 3% zein (based on weight of solids).

A boron carbide panel having a surface area of approximately 18 sq. cm. was electrophoretically coated with 5 mils of cuprous oxide from the above dispersion by applying a negative potential of 150 volts for 2 minutes to the boron carbide panel. The current consumed was approximately 6 milliamperes.

The dried undensified coating was fired in argon at 1000° C. for 20 minutes and then in hydrogen for 10 minutes. The resultant coating was well sintered, adherent and crack-free.

EXAMPLE IV

Copper oxide-molybdenum disulfide dispersion

Four grams of cuprous oxide (−325 mesh) and 6 grams of molybdenum disulfide (−325 mesh) are added to 30 ml. of a zein solution (10 g./liter) in a solvent system consisting of 60% isopropyl alcohol and 40% nitromethane by weight. The slurry is stirred and diluted with 274 ml. nitromethane and 96 ml. isopropyl alcohol. The final dispersion contains approximately 3% solids (based on total weight of dispersion) and 3% zein (based on weight of solids).

A stainless steel rod having a surface area of 6.5 sq. cm. was coated with a cuprous oxide-molybdenum disulfide coating 15 mils thick from the above dispersion by applying a negative potential of 100 volts to the stainless steel rod for 45 seconds. The current consumed was approximately 5 milliamperes. In the manner described in Example I, the coating was dried, fired in hydrogen at 300° C. for 1 hour to reduce the cuprous oxide to metallic copper, bagged, and densified at approximately 25 t.s.i. The densified coating was subsequently sintered in argon for 2 hours at 1000° C. The resultant coating was well sintered, adherent and crack-free.

EXAMPLE V

Chromium oxide dispersion

Ten grams of chromic oxide (−325 mesh) are added to 10 ml. of a zein solution (20 g./liter) in a solvent system consisting of 60% isopropyl alcohol and 40% nitromethane by weight. The slurry is mixed and diluted with 230 ml. isopropyl alcohol and 230 ml. of nitropropane. The final dispersion contains approximately 2% solids (based on total weight of dispersion) and 2% zein (based on weight of solids).

An Inconel panel having a surface area of 12 sq. cm. was electrophoretically coated with 15 mils of chromium oxide by applying a negative potential of 300 volts of the Inconel panel for 3 seconds. The current consumed was approximately 10 milliamperes. In the manner also described in Example I, the coating was dried, reduced with hydrogen at 950° C. for 1 hour, bagged and densified at approximately 50 t.s.i.

The densified coating was subsequently sintered in hydrogen for 1 hour at 1200° C.; a well-sintered, adherent and crack-free coating was then obtained.

EXAMPLE VI

Aluminum oxide dispersion

A dispersion is prepared containing aluminum oxide and zein in an isopropyl alcohol-nitromethane solvent system. The final dispersion contains approximately 10% solids (based on the total weight of dispersion) and 3% zein (based on weight of aluminum oxide).

A graphite panel was coated with an aluminum oxide coating from the above dispersion by electrophoretic deposition. The coating was densified at approximately 20 t.s.i. and sintered in an argon atmosphere at 1800° C. for 30 minutes.

Coatings may be formed on a variety of base materials such as metals, graphite and ceramics. Moreover, a variety of coating materials may be used, including ceramics, metals, metal oxides and composite coatings of metals and non-metals. Examples of suitable coating materials in addition to those set forth in the examples are nickel, chromium, iron oxide, molybdenum trioxide, columbium carbide, chromium carbide, and mixtures of these coating material powders.

While all the examples are directed to the use of zein as the prolamine activator, it is possible to use other prolamines with equally good results.

It will occur to those skilled in the art that there are many modifications to the invention as specifically described herein. In the examples, other liquid vehicles and other coating agents may be employed. It is intended to include all such modifications within the scope of the appended claims.

I claim:

1. A coating suspension for the electrophoretic deposition of the coatings on a base material consisting essentially of a finely divided inorganic coating material, from about 0.5% to about 5% by weight of a prolamine based on the weight of the coating material, and a liquid organic solvent of a high dielectric constant and a low viscosity, capable of dissolving said prolamine.

2. A coating suspension for the electrophoretic deposition of coating on a base material consisting essentially of a finely divided inorganic coating material, from about 1% to about 3% by weight of a prolamine based on the weight of said coating material, and a liquid organic solvent of a high dielectric constant and a low viscosity, capable of dissolving said prolamine.

3. A coating suspension for the electrophoretic deposition of coatings on a base material consisting essentially of a finely divided inorganic coating material, from about 0.5% to about 5% by weight of zein based on the weight of the coating material and a liquid organic solvent of high dielectric constant and a low viscosity, capable of dissolving zein.

4. A coating suspension for the electrophoretic deposition of coatings on a base material consisting essentially of a finely divided inorganic coating material, from about 1% to about 3% by weight of zein based on the weight of said coating material and a liquid organic solvent of high dielectric constant and a low viscosity, capable of dissolving zein.

5. The method of producing coatings on a base material which comprises contacting said base material with a coating suspension consisting essentially of a finely divided inorganic coating material and at least about 0.5% by weight based on the weight of the coating material of a prolamine in a liquid organic solvent of high dielectric constant and a low viscosity capable of dissolving said prolamine, the amount of said prolamine being about from 0.5% to about 5% by weight based on the weight of the coating material, and electrophoretically depositing said inorganic coating material on said base material.

6. The method as set forth in claim 5 wherein the said coating suspension contains from about 1% to about 3% of said prolamine based on the weight of the coating material in said suspension.

7. The method as set forth in claim 5, wherein said prolamine is zein.

8. The method as set forth in claim 6 wherein said prolamine is zein.

9. A coating suspension for the electrophoretic deposition of coatings on a base consisting essentially of finely divided nickelous oxide, from about 0.5 to about 5% by weight of zein based on the weight of nickelous oxide and a solvent consisting of about 60% isopropyl and about 40% nitromethane by weight.

References Cited in the file of this patent

UNITED STATES PATENTS

| | | |
|---|---|---|
| 2,431,417 | Obey | Nov. 25, 1947 |
| 2,462,125 | Oakes | Feb. 22, 1949 |
| 2,463,738 | Bernhart | Mar. 8, 1949 |
| 2,843,541 | Senderoff et al. | July 15, 1958 |
| 2,860,098 | Fahnoe et al. | Nov. 11, 1958 |